July 18, 1961
E. J. SVENSON
2,992,614
MACHINE TOOL ACTUATING MEANS
Original Filed June 16, 1954
4 Sheets-Sheet 3
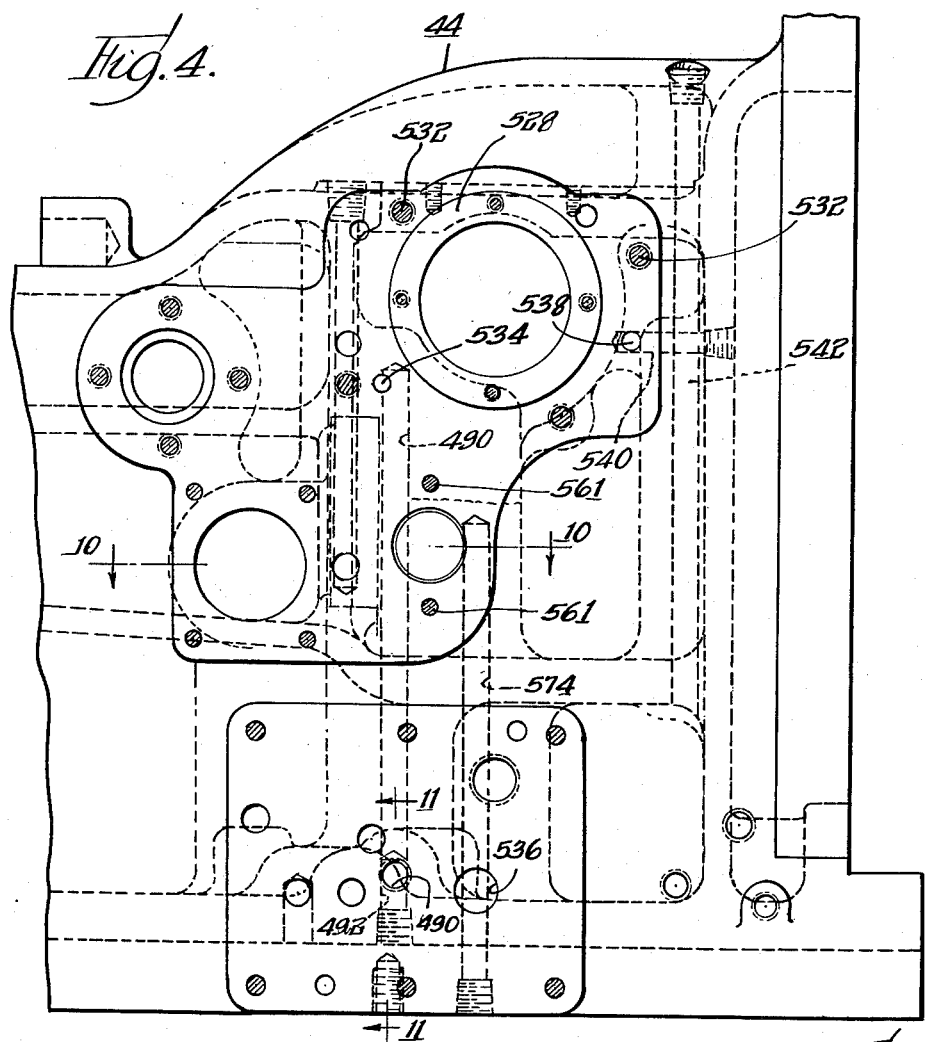
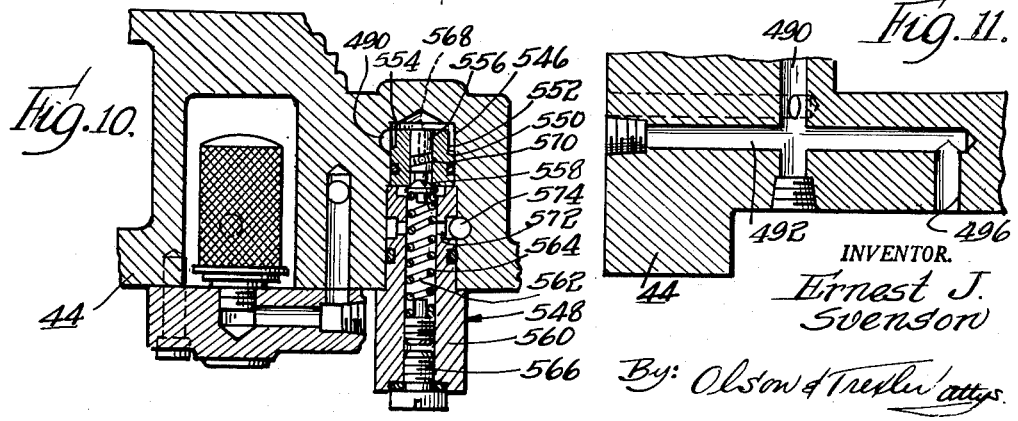
INVENTOR.
Ernest J. Svenson
By: Olson & Trexler attys.

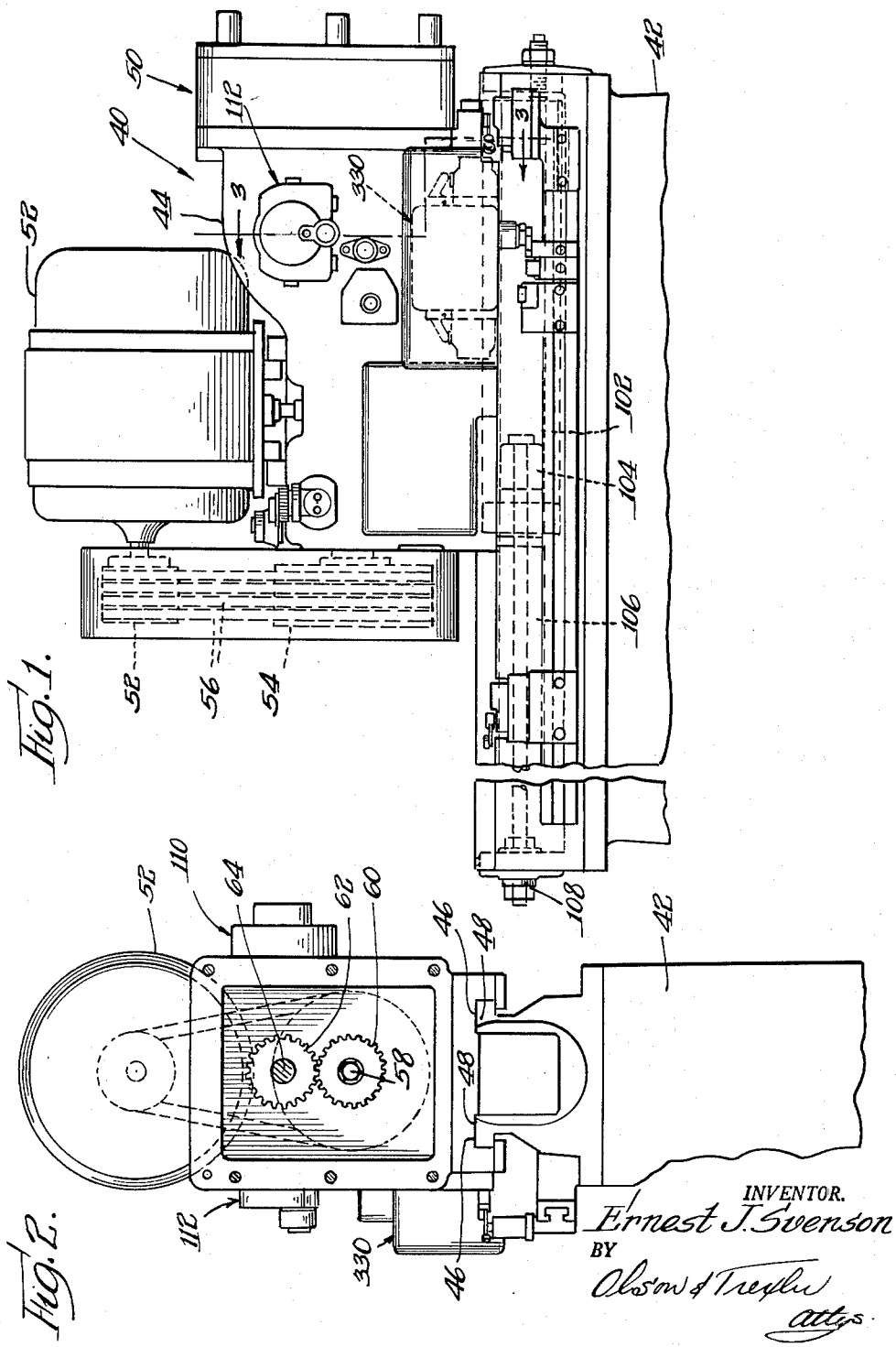

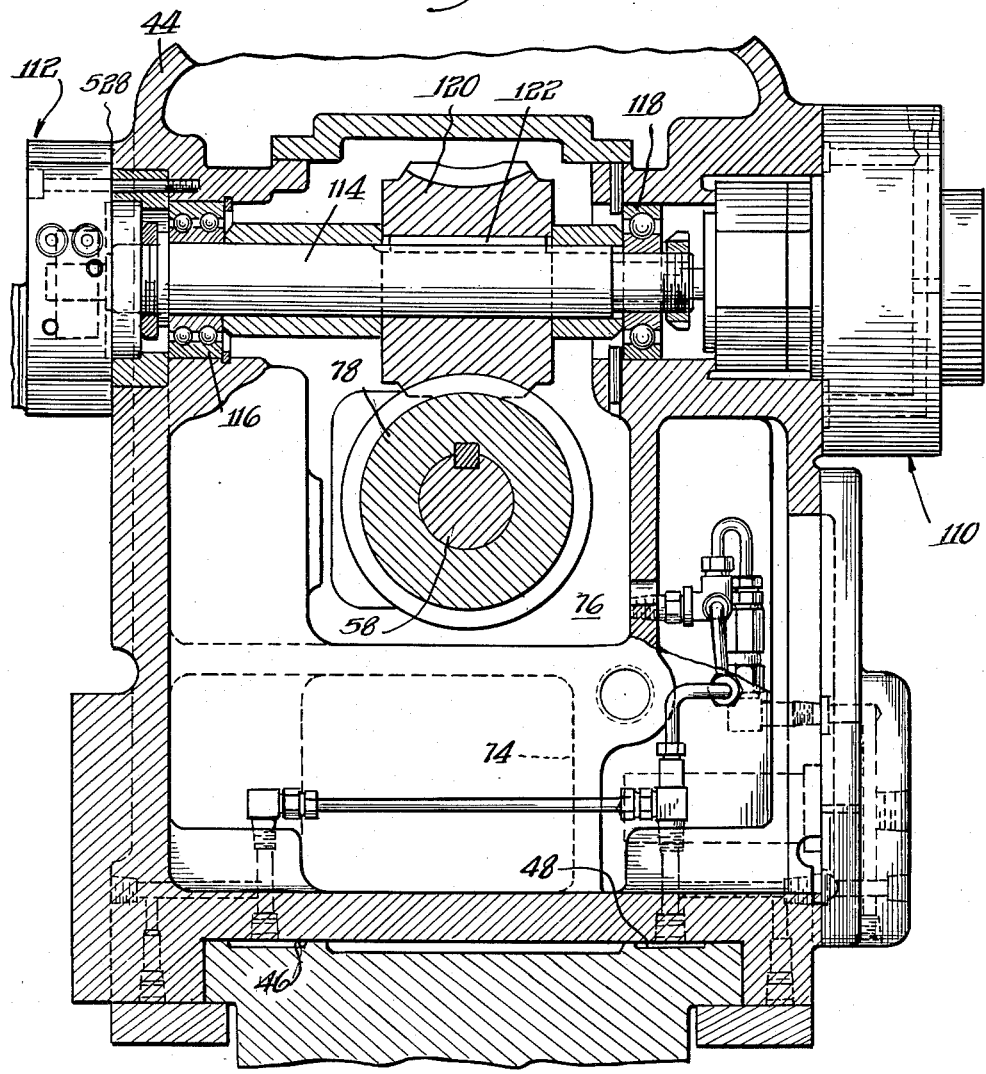

July 18, 1961 E. J. SVENSON 2,992,614
MACHINE TOOL ACTUATING MEANS
Original Filed June 16, 1954 4 Sheets-Sheet 4
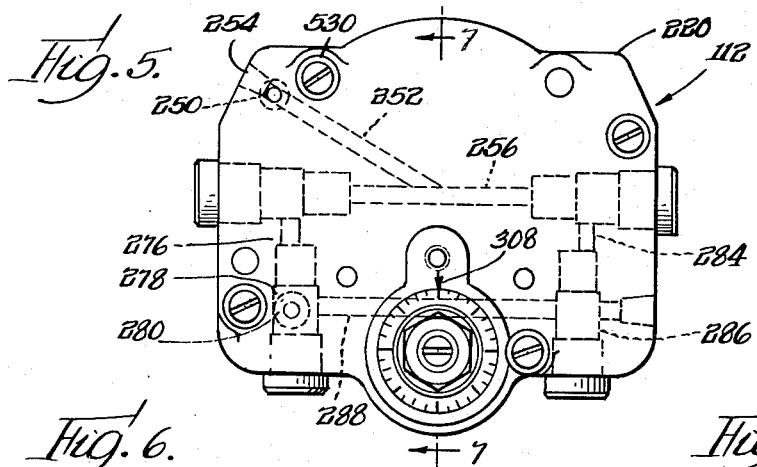
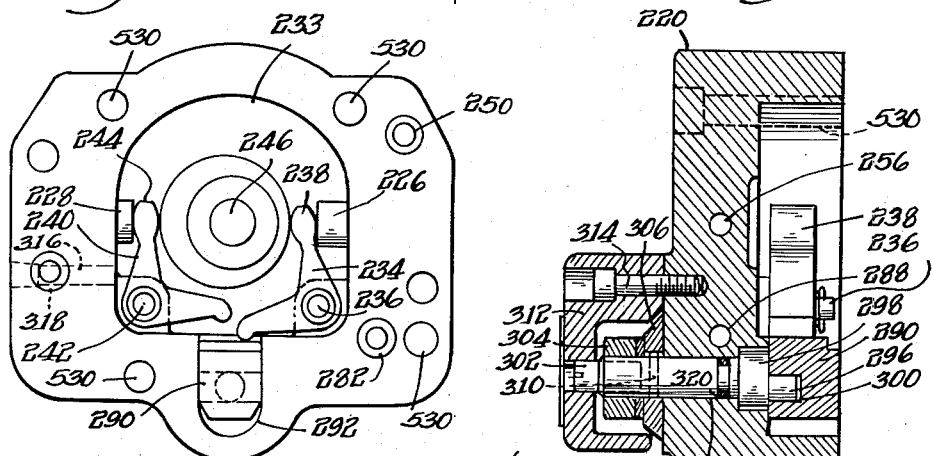
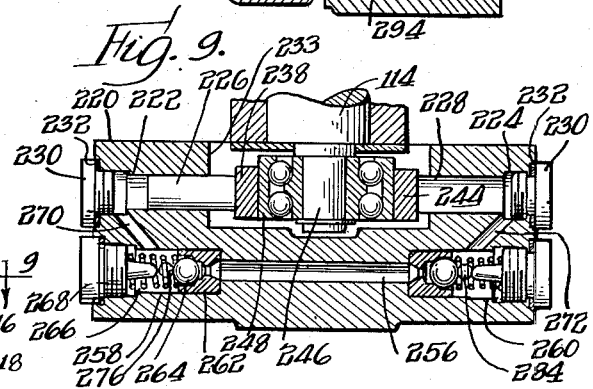
INVENTOR.
Ernest J. Svenson
BY
Olson & Trexler
attys.

United States Patent Office 2,992,614
Patented July 18, 1961

2,992,614
MACHINE TOOL ACTUATING MEANS
Ernest J. Svenson, Rockford, Ill., assignor, by mesne assignments, of one-half to Odin Corporation, Rockford, Ill., a corporation of Illinois, and one-half to W. F. and John Barnes Company, Rockford, Ill., a corporation of Illinois
Original application June 16, 1954, Ser. No. 437,067, now Patent No. 2,921,437, dated Jan. 19, 1960. Divided and this application Mar. 19, 1959, Ser. No. 800,572
4 Claims. (Cl. 103—38)

The present invention relates to machine tools and more particularly to "self-contained" machine tool units which are translated hydraulically by a hydraulic actuating means mounted on the units.

The present application is a division of my co-pending application Serial No. 437,067, filed June 16, 1954, which issued on January 19, 1960, as Patent Number 2,921,437.

One object of the invention is to provide an improved machine tool having improved and simplified means for supplying translating fluid under pressure at a readily variable output rate which determines the machine tool feeding speed.

Other and more detailed objects and advantages of the present invention will become apparent from the following description and the accompanying drawings wherein:

FIG. 1 is a side elevational view of an apparatus embodying the novel features of the present invention;

FIG. 2 is a right hand end elevational view of the apparatus shown in FIG. 1;

FIG. 3 is an enlarged fragmentary cross sectional view taken, generally, along line 3—3 in FIG. 1;

FIG. 4 is an enlarged fragmentary front elevational view of the sliding head casting of the apparatus shown in FIG. 1;

FIG. 5 is a front elevational view of the novel feed pump of this invention;

FIG. 6 is a rear elevational view of the novel feed pump;

FIG. 7 is a cross sectional view taken along line 7—7 in FIG. 5;

FIG. 8 is an end elevational view of the novel feed pump;

FIG. 9 is a cross sectional view taken along line 9—9 in FIG. 8;

FIG. 10 is a fragmentary cross sectional view taken along the line 10—10 in FIG. 4 and further showing a relief valve and filter mounted in the sliding head casting; and FIG. 11 is an enlarged fragmentary cross sectional view taken along the line 11—11 in FIG. 4.

Referring now more specifically to the drawings wherein like parts are designated by the same numerals throughout the various figures, the apparatus shown for the purpose of illustrating the present invention includes one or more self-contained machine tool units 40 as shown best in FIGS. 1 and 2.

*Mechanical and supporting structures*

As shown best in FIGS. 1 and 2, the self-contained unit 40 of this invention is adapted to be slidably mounted on a base structure 42 and to this end the unit 40 includes a head casting 44 that is provided with guideways 46 which cooperate with guideways 48 on the base structure. A suitable spindle head 50 is mounted to the face of the head casting by means of screws or the like, not shown, and an electric motor 52 is mounted on the head casting for driving the spindles through pulleys 52 and 54, a plurality of V-belts 56 and a drive shaft 58. The pulley 54 is mounted on one end of the drive shaft 58 and a gear 60 is fixed on the opposite end of the drive shaft which gear meshes with one or more pickoff gears 62 mounted on spindle drive shafts 64.

The head casting or frame 44 is provided with an oil reservoir or chamber 74 and a gear chamber 76, FIG. 3. The drive shaft 58 extends through the gear chamber and has mounted thereon a gear 78.

In order to reciprocate the self-contained unit 40 on the base 42, a fluid motor is provided. This motor includes a hydraulic cylinder 102 secured to the head frame 44, a piston 104 disposed within the cylinder and a piston rod 106 which is fixed to the base as indicated at 108. Preferably, the piston rod is adjustably secured to the base by a pair of nut members.

In order to actuate the fluid motor, a rapid traverse gear pump 110 and a feed pump 112 have been provided, which pumps are mounted or connected to opposite ends of a shaft 114 as shown best in FIG. 3. The shaft 114 is rotatably mounted within the head frame or casting 44 by suitable anti-friction bearing means 116 and 118. A gear 120 is fixed to the shaft 114 by means of a key 122, which gear meshes with the gear 78 for driving the shaft 114. The gears 78 and 120 are of the type commonly known as "cone gears." It should be noted that the pumps 110 and 112 are exposed to the exterior of the head frame so that they are easily accessible for repair or replacement.

*Feed pump*

The variable output feed pump 112 is shown best in FIGS. 3 and 5 through 9 and includes a one-piece body member 220. The body member is provided with a pair of opposed cylindrical pumping chambers 222 and 224 in which are slidably disposed pistons 226 and 228, FIG. 9. The outer ends of the pumping chambers are closed by plugs 230 and sealing washers 232 and the pistons extend out of the inner ends of the chambers for engagement with actuating means disposed within a recess 233. This actuating means includes a bell crank 234 pivotally mounted to the body member at 236, FIG. 6, and having an end portion 238 for engagement with the piston 226. A similar bell crank 240 is pivotally mounted to the body member at 242 and is provided with an end portion 244 for engaging the piston 228. As shown best in FIGS. 3 and 9, the drive shaft 114 is provided with an eccentric pin portion 246 which extends into the body member 220 between the bell cranks for actuating the bell cranks and, preferably, an anti-friction bearing unit 248 is mounted on the eccentric pin so that the outer race of the bearing unit engages the end portions 238 and 244 of the bell cranks, FIG. 6.

The fluid inlet channel for the pump 112 is provided in part by passageways 250 and 252, FIGS. 5 and 8, which are drilled or otherwise formed in the body member. The outer end of the passageway 252 is closed by a plug 254 and the inner end communicates with a passageway 256, FIG. 9, which opens at its opposite ends into valve chambers 258 and 260 formed at opposite sides of the body member. Check valve means is located in each of these chambers, which means includes a valve seat member 262, a ball valve 264 and a spring 266 backed up by a plug 268 for resiliently urging the ball against the valve seat. A passageway 270 is provided between the outer end of the pumping chamber 222 and the outer portion of the valve chamber 258 and a similarly located passageway 272 is provided between the pumping chamber 224 and the valve chamber 260. With this arrangement, it is seen that fluid under pressure from the pump structure 110 may enter the pump 112 through the inlet passageways, force the check valve 264 open and thence pass into the pumping chambers. Since the pistons 226 and 228 are actuated alternately by the eccentric pin and bearing means, it is understood that the charging fluid from the pump structure 110 will enter into the pumping chambers alternately. Thus, with the parts in the position shown in FIG. 9, the charging or pre-loading fluid will pass through the check valve in the chamber 258 and thence into the pumping chamber 222 during the time that the piston 228 is moving outwardly during its pumping stroke. The charging fluid entering the chamber 222 not only fills the chamber for the next pumping stroke of the piston 226 but also serves to force the piston towards its innermost position. The charging fluid entering the feed pump is under considerable pressure, and this materially increases the efficiency and accuracy of the feed pump. This results from the fact that the fluid entering the feed pump has been slightly compressed so that it cannot be further compressed an appreciable amount by the feed pump. While, of course, the amount which non-loaded or pressurized fluid might be compressed by the feed pump is small and in the nature of about .05%, such compression is often sufficient to introduce an undesirable error in the work performed by the machine tool unit. In addition, the pre-loading of the charging fluid substantially eliminates any possibility of fluid leaking back through the check valves during pumping strokes of the pistons.

The fluid pumped from the chamber 222 passes back through the passageway 270 into the chamber 258 and thence into a passageway 276 which is shown best in FIG. 5. The passageway 276 opens into a check valve chamber 278 in which is located a check valve structure 280 which may be substantially identical to the check valve described above and, therefore, need not be set forth in detail. Finally, the fluid passes from the chamber 278 through an outlet passageway 282, FIG. 6, which is drilled or otherwise formed in the body member. The fluid from the pumping chamber 224 similarly passes back through the passageway 272 and the check valve chamber 260 and thence into a passageway 284. The passageway 284 connects with another check valve chamber 286 in which is disposed a suitable check valve structure, not shown, which is identical to the valve structure 280. A transversely extending passageway 288 connects the chambers 278 and 286 so that the fluid from the pumping chamber 224 is also ultimately discharged through the passageway 282. As will be understood, the check valve 280 prevents fluid being discharged from the pumping chamber 224 from passing upwardly toward the pumping chamber 222 while the chamber 222 is being charged with fluid from the pump structure 110, and the check valve in the chamber 286 acts in a similar manner when fluid is being discharged from the pumping chamber 222.

From the above description, it is apparent that the pistons 226 and 228 are alternately forced outwardly by the eccentric pin 246 and its associated elements to pump the fluid from their respective chambers and they are alternately forced inwardly during charging of their respective chambers by the pressure of the pre-charging fluid. In order to vary the rate of discharge of the feed pump 112, means is provided for adjustably limiting the inward movement of the pistons, or, in other words, means is provided for changing the length of the stroke of the pistons. This means includes a block 290, FIGS. 6 and 7, which is slidably mounted in a suitable slot 292 formed in the body member. As shown best in FIGS. 6 and 7, the block 290 is disposed for engagement by the ends of the bell cranks 234 and 240 whereby the block serves to limit the pivotal movement of the bell cranks during the charging stroke of the pistons. Thus, by adjusting the position of the block 290, the stroke of the pistons may be changed as desired.

In order to adjustably support the block 290, a shaft 294 is rotatably mounted in a suitable bore in the body member which shaft is provided with an eccentric pin 296 disposed within a suitable recess formed in the body member. The eccentric pin 296 extends into a slot 300 formed in the block 290 so that upon rotation of the shaft 294 the eccentric pin serves to raise or lower the block. A threaded stud 302 is inserted into a bore in the outer end of the shaft 294 to provide convenient means for adjusting the shaft and the shaft may be locked in any desired adjusted position by a clamping nut 304.

In order to provide means for indicating the position to which the shaft 294 is adjusted, a dial 306 is mounted thereon for cooperation with a pointer 308 formed on the body member. The dial is retained against rotation relative to the shaft by means of a pin 310. Preferably, the outer end of the shaft 294 is covered by a cap 312 which is secured to the body member by a screw 314 in order to prevent inadvertent or unauthorized adjustment of the shaft.

The body member 220 is provided with passageways 316 and 318 in order to drain any fluid which accumulates within the recess 233. In addition, an O ring 320 is provided within a suitable groove in the shaft 294 to prevent the fluid from escaping along the shaft.

As shown best in FIGS. 3 and 4, the head frame 44 is provided with a machined surface 528 against which the feed pump 112 is mounted and retained by a plurality of screws passing through apertures 532 in the head frame. The outlet 282 of the feed pump, FIG. 6, registers with a passageway 534 formed in the head frame. As shown best in FIG. 4, the passageway 490 extends upwardly and intersects the passageway 534 so that the outlet of the feed pump is connected to the forward end of the cylinder 102, FIG. 1, through the passageways 492 and 496, FIGS. 4 and 11.

The sliding head frame is provided with a passageway 538 which communicates with the drain opening 318 of the feed pump 112, FIG. 8, and also intersects a passageway 540. The passageway 540 communicates with a vertically extending passageway 542 which directs the fluid back to the reservoir.

The passageway 490 through which fluid discharged from the feed pump passes intersects a chamber 546 formed in the head frame, which chamber houses a feed pump relief valve structure generally designated with numeral 548, see FIG. 10. The relief valve structure 548 includes a seat member 550 having a reduced diameter portion 552 and an end slot 554 so that fluid may pass from the passageway 490 around the inner end of the seat member. The seat member is provided with a central bore in which is slidably disposed a stem 556 of a valve 558. A hollow body member 560 is mounted partially within the valve chamber, which body member is provided with an integral apertured lug, not shown, for receiving securing screws adapted to be threaded into apertures 561 in the head frame, FIG. 4. A compression spring 562 is mounted within the bore 564 of the body member for yieldably retaining the valve 558 against the valve seat. The pressure at which the valve will open may be easily adjusted by turning the screw member 566 against which the spring abuts.

The relief valve stem 556 is provided with a centrally located bore 568 which opens into an angularly disposed groove 570. It should be noted that the groove is formed so that the side walls thereof extend at an acute angle to the longitudinal axis of the valve stem. With this structure, the valve must be moved so that the entire periphery of the groove 570 emerges from the bore in the valve seat member before the valve will be completely open, whereby the valve serves to relieve the pressure progressively as required, thereby avoiding sudden changes in the pressure of the fluid operating to feed the head frame. The fluid which flows around the valve 558 passes from the bore of the body member 560 into a transverse opening 572 which communicates with a vertical passageway 574 formed in the head frame. The passageway 574, in turn, is connected to the drain passageway 536, FIG. 4.

The invention is claimed, as follows:

1. In a machine, the combination of a machine housing defining a pump mounting face thereon, a power shaft journalled in said housing, an eccentric journal on said shaft cantilevering from the outer end of the shaft beyond said mounting face, a pump housing adapted to be detachably mounted on said machine housing and defining a face surface adapted to fit against said pump mounting face, said pump housing defining an internal cavity opening through the pump housing face surface, said pump housing defining a pair of pump cylinders extending in opposite directions from said cavity into the pump housing in coaxial relation to each other, a pair of pumping plungers slidably mounted in said respective cylinders, an inlet bore formed within said pump housing and opening through said face surface thereon, a pair of inlet check valves mounted within said pump housing and connecting said inlet bore with the ends of said respective pump cylinders remote from said cavity, an outlet bore formed within said pump housing and opening through the face surface thereof, a pair of outlet check valves connecting said outlet bore with said respective pump cylinders, an antifriction bearing mounted on said cantilevering eccentric journal and including an outer race adapted to orbit within said pump housing cavity between said pistons, two bell cranks rockably mounted within said cavity on two pivots on said pump housing, each bell crank including a transmission finger projecting into a position intervening between the inner end of a corresponding one of said pistons and said outer bearing race to move the adjacent piston outwardly intermittently upon rotation of said shaft, a pump adjusting abutment slidably mounted in said pump housing in radially spaced relation to the axis of said shaft, a pump adjusting element rotatably mounted in said pump housing and including an eccentric connected to said adjusting abutment to slide the latter toward and away from the axis of said shaft, means for holding said pump adjusting element in adjusted positions thereof, and said bell cranks each including a motion limiting finger extending into alignment with said abutment to engage the latter and limit the extent of swinging movement of said transmission fingers toward said shaft axis to determine the effective strokes of said pistons in accordance with the position of said adjustable abutment.

2. In a machine, the combination of a machine housing defining a pump mounting face thereon, a power shaft journalled in said housing, an eccentric actuating element on said shaft cantilevering from the outer end of the shaft beyond said mounting face, a pump housing adapted to be detachably mounted on said machine tool housing and defining a face surface adapted to fit against said pump mounting face, said pump housing defining an internal cavity opening through the pump housing face surface, said pump housing defining two opposed pump cylinders extending in opposite directions from said cavity into the pump housing, a pair of pumping plungers slidably mounted in said respective cylinders, an inlet bore formed within said pump housing and extending from said face surface thereon to said pump cylinders, an outlet bore formed within said pump housing and extending from pump cylinders to said pump housing face surface, two bell cranks rockably mounted on said pump housing within said cavity, each bell crank including a transmission finger projecting into a position intervening between the inner end of a corresponding one of said pistons and said eccentric actuating element to move the adjacent piston outwardly intermittently upon rotation of said shaft, a single pump adjusting abutment movably mounted in said pump housing in a medial location with respect to said cranks, a pump adjusting element coacting with said adjusting abutment to adjust the latter toward and away from the axis of said shaft, and said bell cranks each including a motion limiting finger extending into alignment with said abutment to engage the latter and limit the extent of swinging movement of said transmission fingers toward said shaft axis to determine the effective strokes of said pistons in accordance with the position of said adjustable abutment.

3. A pump comprising, in combination, a pump housing defining an internal cavity opening outwardly through one side of the housing, said housing defining two feed pump cylinders extending in opposite directions into the housing from said cavity in coaxial relation to each other, a pair of pumping plungers slidably mounted in said respective cylinders, fluid inlet means including inlet valves disposed within said housing and communicating with the ends of said cylinders opposite from said cavity, fluid discharge means including outlet valves disposed within said housing and communicating with said ends of said cylinders, two bell-crank rockers medially pivoted on said housing within said cavity, each rocker having a transmission arm and a motion limiting arm, the transmission arms on said respective rockers extending into abutting alignment with the inner ends of said respective plungers, a common abutment stop for limiting the range of swinging movement of both said rockers, said motion limiting arms on both of said rockers extending into interfering relation with said abutment stop for engagement therewith to limit inward movement of the coacting plungers, means for adjusting the position of said abutment stop to adjust the extent of maximum inward movement of both said plungers, a rotary drive shaft supported independently of said housing but positioned in alignment with said housing cavity, and a pump actuator eccentrically disposed on said shaft and centilevering therefrom into said pump cavity between said transmission fingers of said respective rockers to move said transmission fingers cyclically against said respective pistons upon rotation of said shaft.

4. A pump comprising, in combination, a pump housing defining an internal cavity therein, said housing defining two opposed feed pump cylinders extending in opposite directions into the housing from said cavity in positions such that the axes of the two cylinders are disposed substantially within a common plane, a pair of pumping plungers slidably mounted in said respective cylinders, fluid inlet means in said housing communicating with the ends of said cylinders opposite from said cavity, fluid discharge means in said housing communicating with said ends of said cylinders, two bell-crank rockers medially pivoted on said housing and including transmission arms in said respective rockers extending into abutting alignment with the inner ends of said respective plungers, a common abutment stop for limiting the range of swinging movement of both said rockers, said rockers each including a motion limiting arm extending into interfering relation with said abutment stop for engagement therewith to limit inward movement of the transmission arms of the rockers and hence limit inward movement of the coacting plungers, means for adjusting the position of said abutment stop to adjust the extent of maximum inward movement of both said plungers, a rotary drive shaft supported in alignment with said housing cavity, and a pump actuator eccentrically disposed on said shaft and cantilevering therefrom into said pump cavity between said transmission fingers of said respective rockers to move said transmission fingers cyclically against said respective pistons upon rotation of said shaft.

References Cited in the file of this patent

UNITED STATES PATENTS

| | | |
|---|---|---|
| 1,640,509 | Lowe | Aug. 30, 1927 |
| 2,341,196 | Svenson | Feb. 8, 1944 |
| 2,382,452 | Svenson | Aug. 14, 1945 |
| 2,414,617 | Summers | Jan. 21, 1947 |
| 2,560,283 | Giesey | July 10, 1951 |

FOREIGN PATENTS

| | | |
|---|---|---|
| 65,009 | Sweden | Apr. 17, 1928 |
| 427,910 | Great Britain | May 2, 1935 |